United States Patent
Mendhekar et al.

(10) Patent No.: US 9,042,644 B2
(45) Date of Patent: *May 26, 2015

(54) ARTIFACT REMOVAL METHOD AND SYSTEM FOR CONTOURED IMAGES AND VIDEO

(71) Applicant: Cinova Media, Mountain View, CA (US)

(72) Inventors: Anurag Mendhekar, Los Altos, CA (US); Sunil Sanghavi, Los Altos, CA (US)

(73) Assignee: CINOVA MEDIA, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/165,467

(22) Filed: Jan. 27, 2014

(65) Prior Publication Data

US 2014/0140618 A1 May 22, 2014

Related U.S. Application Data

(63) Continuation of application No. 13/424,311, filed on Mar. 19, 2012, now Pat. No. 8,639,057.

(51) Int. Cl.
*G06K 9/40* (2006.01)
*G06K 9/00* (2006.01)
*G06T 5/00* (2006.01)
*H04N 19/86* (2014.01)

(52) U.S. Cl.
CPC . *G06T 5/002* (2013.01); *G06K 9/40* (2013.01); *G06T 2200/12* (2013.01); *G06T 2207/10024* (2013.01); *H04N 19/86* (2014.11)

(58) Field of Classification Search
USPC ............. 382/167, 254, 274, 275; 375/240.03, 375/240.2, 240.21, 240.26; 348/607, 348/E5.078
See application file for complete search history.

(56) References Cited

U.S. PATENT DOCUMENTS

| | | | | |
|---|---|---|---|---|
| 5,596,659 | A * | 1/1997 | Normile et al. | 382/253 |
| 5,703,799 | A * | 12/1997 | Ohta | 708/402 |
| 6,016,360 | A * | 1/2000 | Nguyen et al. | 382/166 |
| 6,052,205 | A * | 4/2000 | Matsuura | 358/426.12 |
| 6,463,178 | B1 * | 10/2002 | Kondo et al. | 382/232 |
| 6,625,221 | B2 * | 9/2003 | Knee et al. | 375/240.28 |
| 6,697,521 | B2 * | 2/2004 | Islam et al. | 382/166 |
| 6,792,153 | B1 * | 9/2004 | Tsujii | 382/239 |

(Continued)

FOREIGN PATENT DOCUMENTS

JP 2007104645 4/2007

OTHER PUBLICATIONS

International Search Report, PCT/US07/10706, Sep. 15, 2008 (4 pgs.).

(Continued)

*Primary Examiner* — Amir Alavi
(74) *Attorney, Agent, or Firm* — DLA Piper LLP (US)

(57) ABSTRACT

A system and method that reduce or eliminate step-contouring generated by compression algorithms are provided because many types of compression algorithms introduce a step-contoured artifact for images and video with slow gradients. The system and method restores the gradient to a piece of content by detecting a start and end of the step contour in each row and column of the piece of content and increments a pixel in certain regions of the row or the column to restore the gradient in the piece of content.

15 Claims, 6 Drawing Sheets

(56) References Cited

U.S. PATENT DOCUMENTS

| | | | |
|---|---|---|---|
| 7,149,811 B2* | 12/2006 | Wise et al. | 709/247 |
| 7,791,508 B2* | 9/2010 | Wegener | 341/61 |
| 7,916,960 B2* | 3/2011 | Mizuno | 382/240 |
| 8,130,828 B2* | 3/2012 | Hsu et al. | 375/240.03 |
| 8,265,144 B2* | 9/2012 | Christoffersen et al. | 375/240.1 |
| 2001/0041011 A1 | 11/2001 | Passagio et al. | |
| 2001/0048770 A1 | 12/2001 | Maeda | |
| 2003/0002734 A1 | 1/2003 | Islam et al. | |
| 2003/0202581 A1 | 10/2003 | Kodama | |
| 2005/0063599 A1 | 3/2005 | Sato | |
| 2006/0115166 A1 | 6/2006 | Sung et al. | |
| 2007/0237237 A1 | 10/2007 | Chang et al. | |
| 2007/0248163 A1 | 10/2007 | Zuo et al. | |
| 2010/0066912 A1 | 3/2010 | Kumwilaisak et al. | |
| 2011/0103445 A1 | 5/2011 | Jax et al. | |
| 2011/0206287 A1 | 8/2011 | Islam | |

OTHER PUBLICATIONS

Written Opinion, PCT/US07/10706, Sep. 15, 2008 (5 pgs.).
International Search Report, PCT/US09/48181, Jul. 23, 2009 (3 pgs.).
Written Opinion, PCT/US09/48181, Jul. 23, 2009 (3 pgs.).
Office Action in corresponding Korea Application No. 2011-7001782, dated Aug. 24, 2012, with English translation (7 pgs.).

* cited by examiner

ARTIFACT REMOVAL METHOD AND SYSTEM FOR CONTOURED IMAGES AND VIDEO

CONTINUITY DATA/RELATED APPLICATIONS

This application is a continuation of and claims priority under 35 USC 120 to U.S. patent application Ser. No. 13/424,311 filed on Mar. 19, 2012, now U.S. Pat. No. 8,639,057 and entitled "Artifact Removal Method and System for Contoured Images and Video," the entirety of which is incorporated herein by reference.

BACKGROUND

Many types of known compression algorithms introduce a step-contoured artifact for images and video with slow gradients. It is desirable to provide a system and method that can remove artifacts and it is to this end that the disclosure is directed.

DETAILED DESCRIPTION OF ONE OR MORE EMBODIMENTS

The disclosure is particularly applicable to a DCT type decoder/decompression and it is in this context that the disclosure will be described. It will be appreciated, however, that the system and method has greater utility since it can be implemented in various systems and may be used with various different compression/decompression system and methods including those known in the art and yet to be developed. For example, the system and method may be used with the compression/decompression methods that are described in U.S. Pat. No. 8,077,990 issued on Dec. 13, 2011 which is incorporated herein by reference. In this compression scheme, a step size of 2 is created.

Figure 1A:
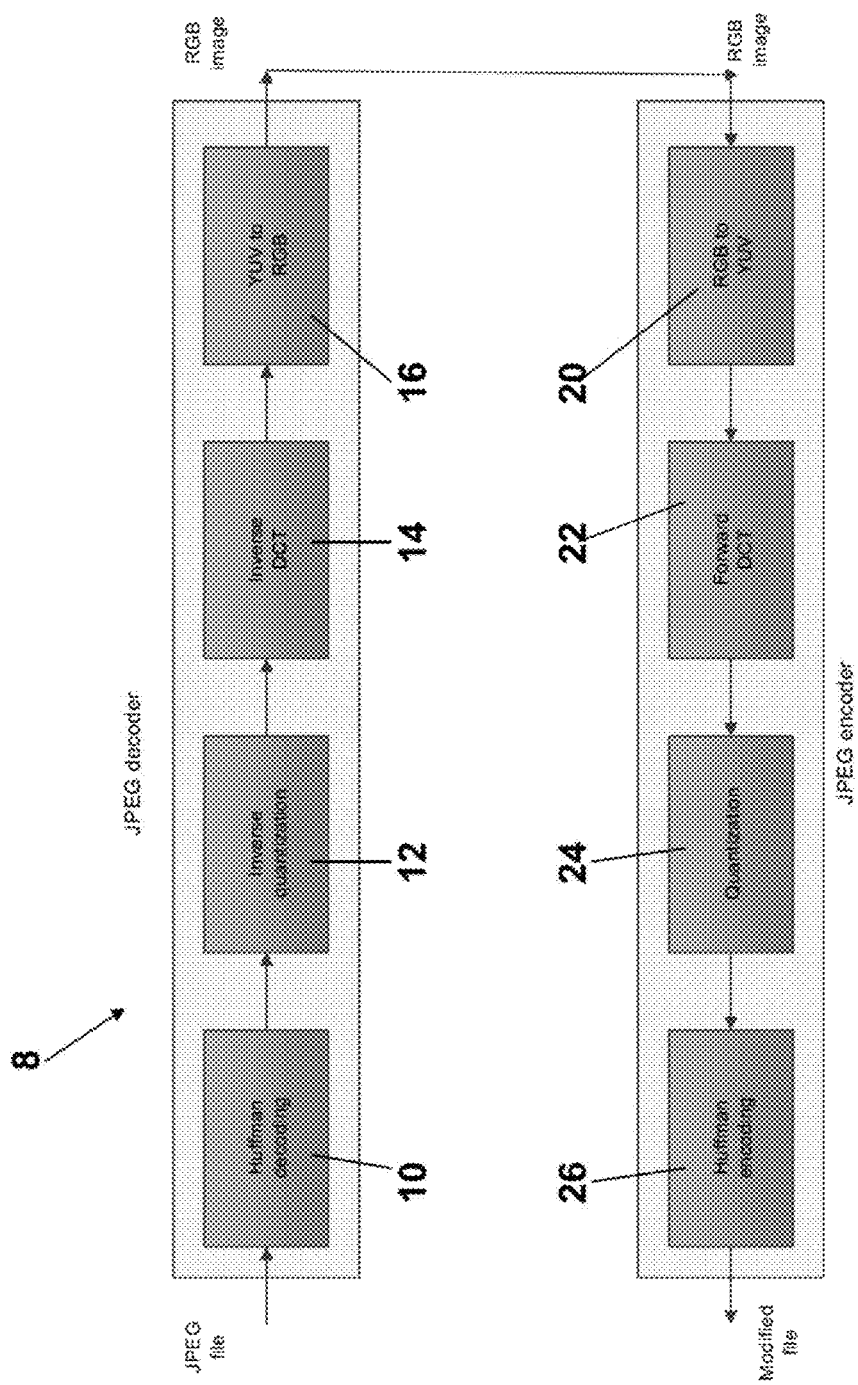
FIG. 1A illustrates a typical compression/decompression process.

FIG. 1A illustrates a process 8 of compressing and decompressing a piece of content wherein the content may be an image, such as a contoured image, and the compression/decompression scheme may be well known JPEG. The process 8 of compressing and decompressing a piece of content may utilize the artifact removal system and method that are described in more detail below. The artifact removal system may also be used for video content that utilize various known or yet to be developed video compression/decompression methods.

As shown in FIG. 1A, consider an image that has already been encoded using the JPEG compression standard. FIG. 1A shows a decoding process and encoding process in which the decoding process includes a Huffman decoder 10, inverse quantizer 12, inverse discrete cosine transform 14 and a YUV to RGB converter 16 which are the typical steps performed during the decoding of a JPEG encoded image. The encoding process may include an RGB to YUV converter 20, a forward discrete cosine transform 22, a quantizer 24 and a Huffman encoder 26 which are the typical steps performed during the encoding of a JPEG image.

Figure 1B:
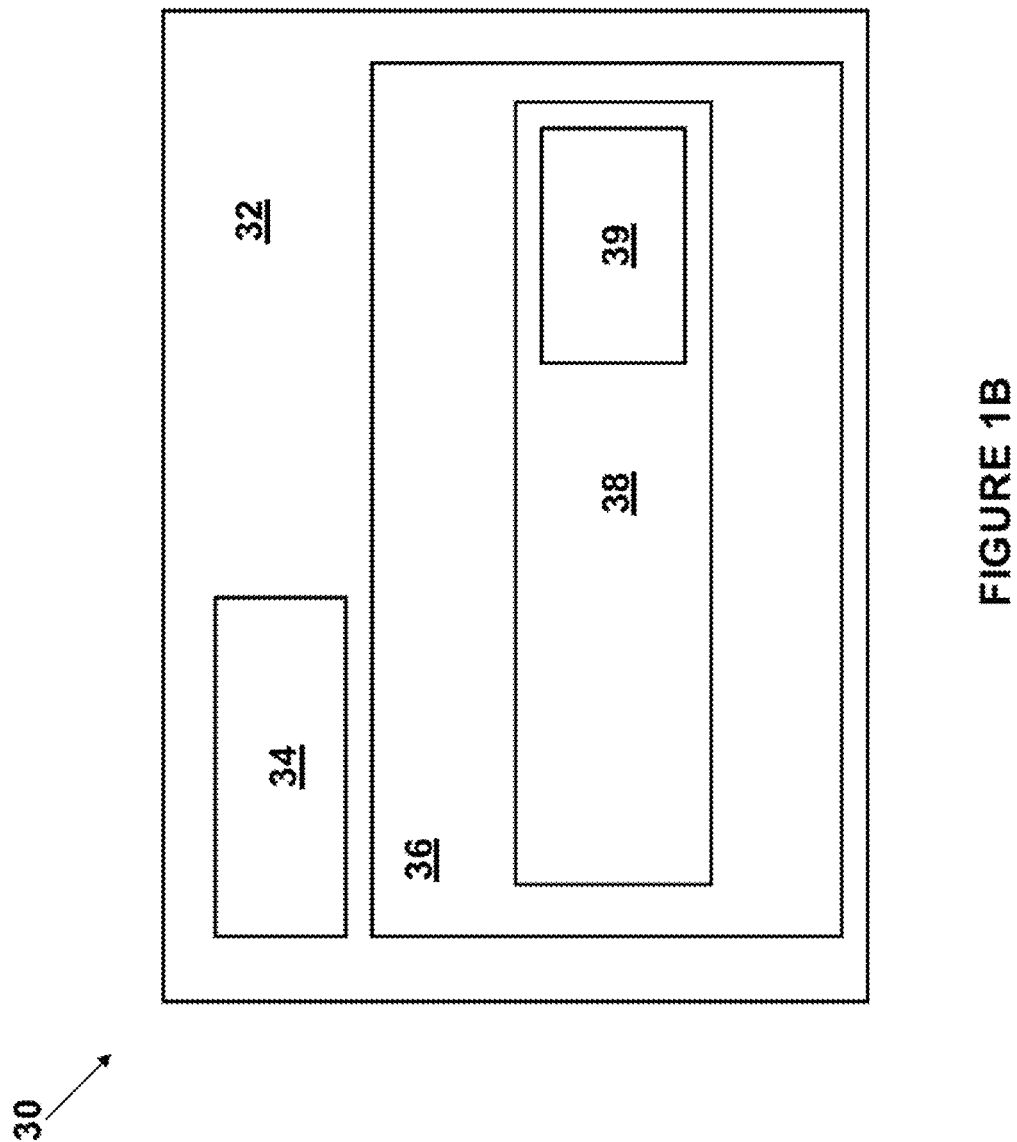
FIG. 1B illustrates an implementation of a decoder/decompressor system that implements the artifact removal method.

FIG. 1B illustrates an implementation of a decoder/decompressor system 30 that implements the artifact removal method. The system may be a computing system 32 that may have one or more processing units 34 and a storage device 36 that communicates with the one or more processing units 34. The storage device 36 may be a persistent storage device, such as a hard drive, optical drive, DVD, CD or other recordable media, or it may be memory, such as SRAM, DRAM, flash and the like. The storage device 36 may store (temporarily or persistently) a decoder 38 that may be implemented as a plurality of lines of computer code in one implementation. The decoder/decompressor system 30 may also be implemented as a cloud application (being executed on cloud resources), as a software as a service (SaaS) model, a programmable logic device, a hardware device that performs the artifact removal processes and the like as the system is not limited to any particular hardware or software implementation of the system. The decoder 38 may also have an artifact removal unit 39 that performs the artifact removal method described below.

In the system, the piece of content may be an image that is a 2 dimensional array (having a number of rows and a number of columns) of numbers representing pixel intensity. Color images are treated as a set of images, one for each color channel, depending upon the chosen color representation. A video frame is also treated as an image. The discourse below applies equally to all of these.

The system is able to handle a slow gradient. A slow gradient in an image or a frame of video, (henceforth referred to commonly as "image") is a contiguous region of the image with slow change of pixel values where neighboring pixel values differ by 1 or 0, and always monotonically in both vertical and horizontal directions. (i.e., an alternating sequence of 1 and 0 is not considered a slow gradient, but a sequence of pixel values 1, 1, 2, 2, 3, 3 is, as is 3, 3, 2, 1, 1, 1, 1).

Figure 2A:
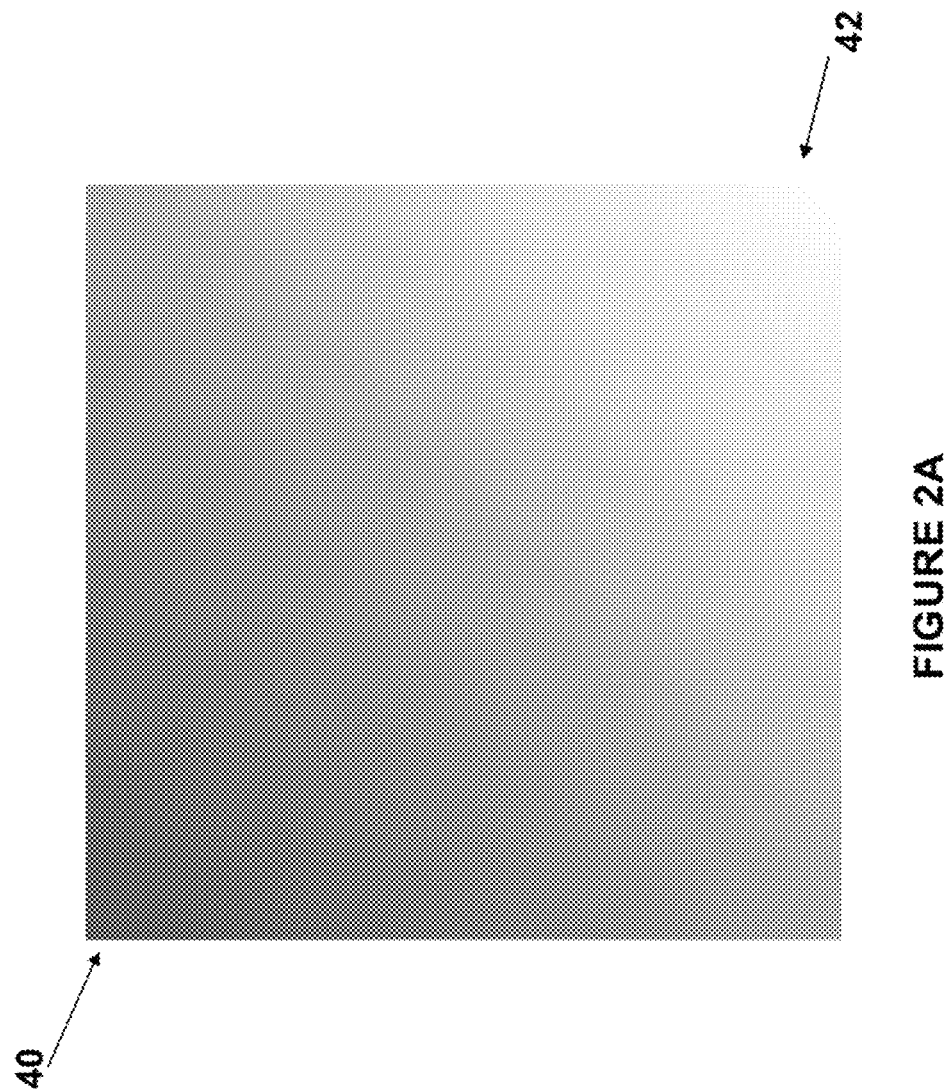
FIG. 2A illustrates a contoured image with a slow gradient.
Figure 2B:
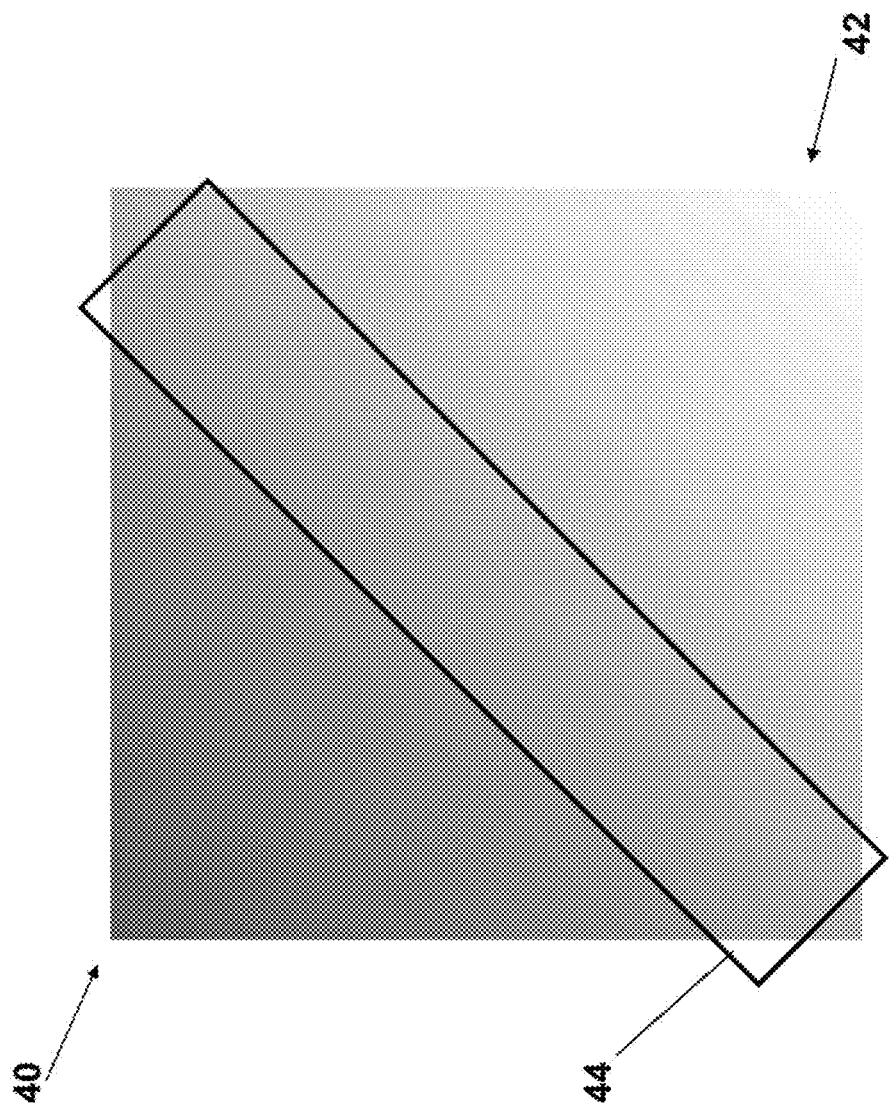
FIG. 2B illustrates the contoured image of FIG. 2A with the artifact that desirable is removed.

A step contour is a compression artifact in an image derived from an image with a slow gradient, which is a contiguous region where the difference between neighboring values is N or 0, where N is a fixed constant which is determined by the compression algorithm, and always monotonically. Step contours are one of the most visible compression artifacts and cause visual quality of compressed images to degrade significantly. FIG. 2A show an example of a slow gradient in an image in which the values of the pixels show change. The slow gradient can be seen as the darker gray in the image in a first corner 40 of the image and then the much lighter gray in a second corner 42 of the image. FIG. 2B shows the same image and corners 40, 42 with step contours from the compression process. A box 44 encloses a number of the step contours that appear as bands along about a 45 degree angle. Now a method implemented by the decompression system in FIG. 1B is described that removes those step contour artifacts from the image.

Figure 3A:
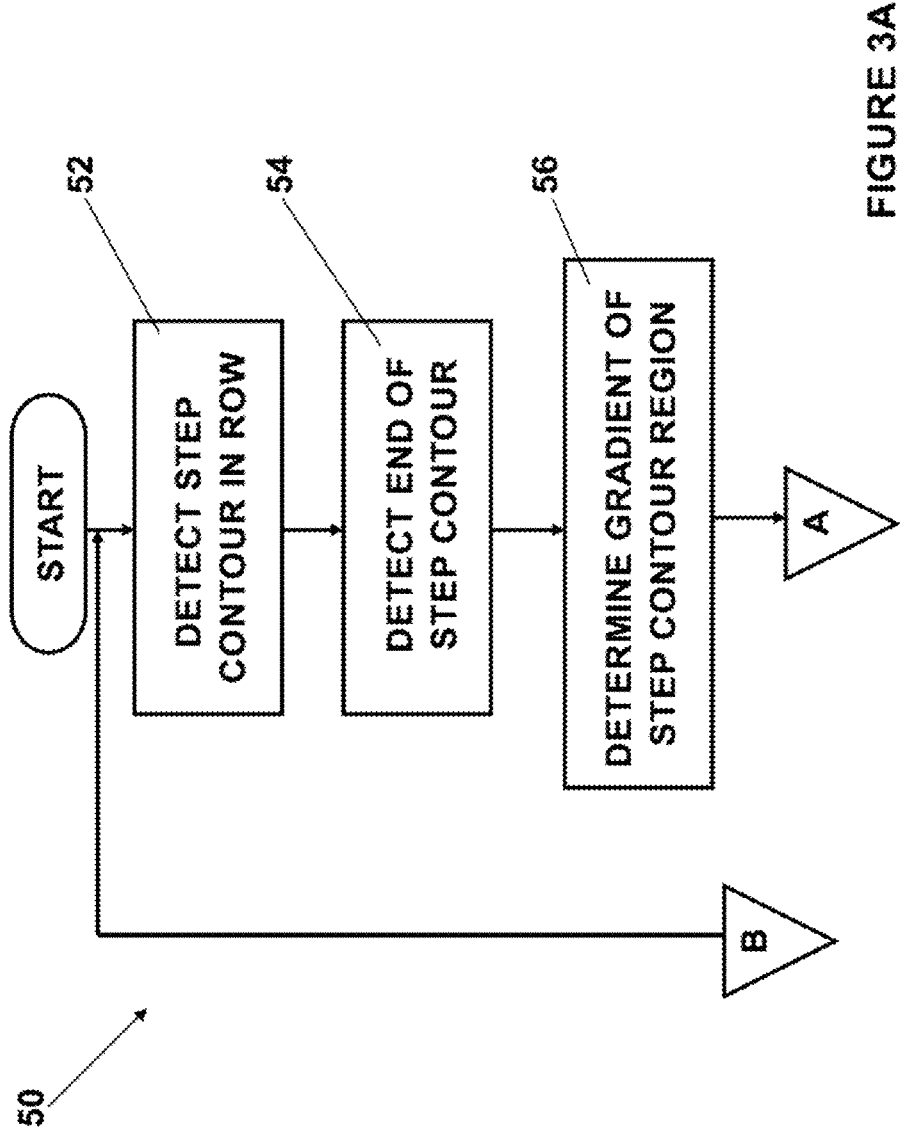
FIGS. 3A-3B illustrate a method for artifact removal that may be implemented by the decoder/decompressor system of FIG. 1B.
Figure 3B:
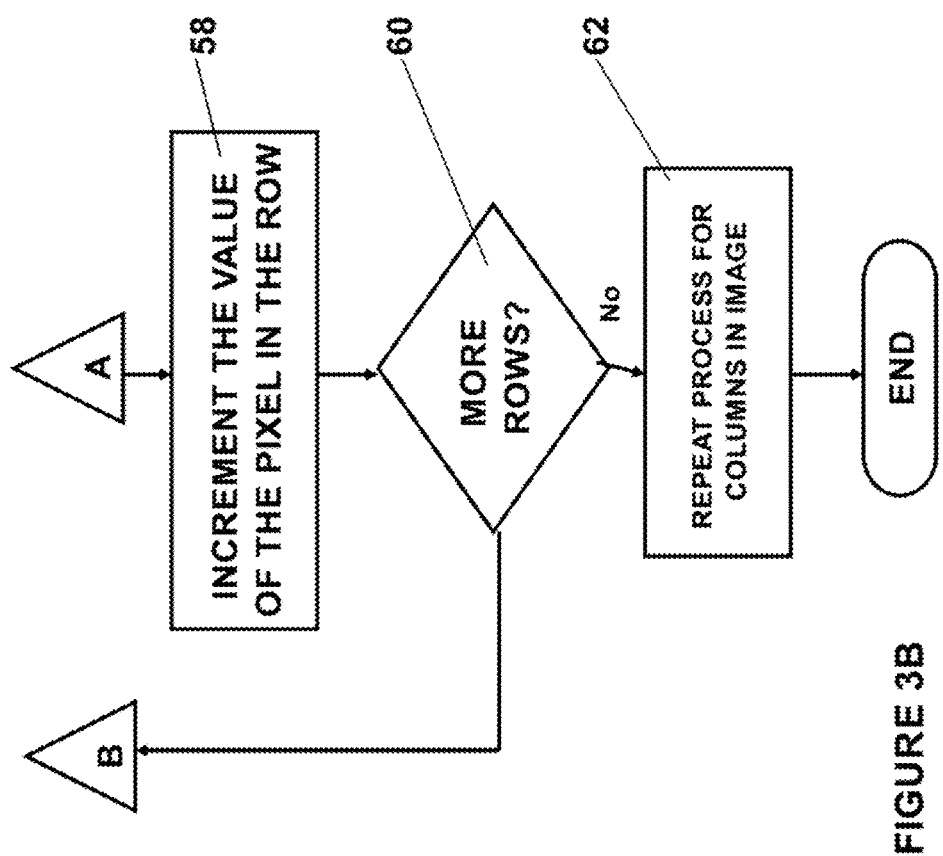

FIGS. 3A-3B illustrate a method 50 for artifact removal that may be implemented by the decoder/decompressor system of FIG. 1B. In one embodiment, the method may be used to restore gradients from step contour artifacts generated by the compression system. In compression and decompression scenarios, the decoder (i.e., the system that does the decompression) does not have access to the original image. In order to remove artifacts in an image that has been decompressed, it is also assumed that the original image cannot be accessed.

In the method, the system may detect a step contour in a row (52) by, for example, horizontally scanning every row of pixels of the image to detect the start of a step contour. During the method, the rows and columns of pixels are represented by digital values that can be loaded into a data structure and then scanned by a computer. The start of a step contour may be detected due to the first pair of pixels scanned with a difference of N or 0. The method then detects the end of the step contour (54) by, for example, continuing to move along the row of pixels to detect the end of step contour, which is defined as the first pair of pixels where the difference between them is:

a. Not 0 or N; OR b. The direction of the difference has changed (it has become non-monotonic).

Next, the method determines the gradient of the step contour (56). In particular, letting L be the length of this region, A is the value of the pixel that started the region and B is the value of the pixel that ended the region, the original gradient is reconstructed by assuming that the gradient was a slow linear change from A to B. Thus, the slope of this line, m, defining this linear change is (B-A)/L.

Next, in the method, if $L>=N$, then let s be the position of the start of the region in the row, and e be the end of the region in the row. For a pixel at position p, $s<=p<=e$, increment the value of the pixel (58) at p by a value $m*(p-s)$, up to integer rounding. If $L<N$, skip this region for incrementing the pixel. Once these steps have been completed for the particular row, the method determines if there are more rows (60) and loops back to process 52 for the next row so that the process is repeated from all rows in the image. If all of the row have been completed, then the method repeats the above processes for each column in the image (62) by scanning vertically.

As a result of the above method, for all regions where $L>N$, the resulting image will have the smooth gradients restored since all neighboring pixels will have a difference of 1 or 0, monotonically. For a sufficiently small N (e.g., 2), this will ensure that slow gradients are restored in the image. Thus, the method removes the step contours (such as those shown in FIG. 2B) and restores the gradients such as those that existed in FIG. 2A above.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A system for removing a compression artifact from an original piece of content, the system comprising:

an artifact removal unit implemented on a computer system that restores a gradient to a piece of content by removing a step contour artifact; and the artifact removal unit detects a start of a step contour and an end of a step contour in each row of the piece of content or each column of the piece of content, determines a gradient of the step contour in each row or each column and increments a pixel in certain regions of the row or the column to restore the gradient in the piece of content.

2. The system of claim 1, wherein the artifact removal unit increments the pixel in a certain region of the row or the column by multiplying a position of the pixel relative to a start of the row or column by a determined gradient for the row or column.

3. The system of claim 1, wherein the artifact removal unit detects the start of the contour by detecting a first pair of pixels scanned with a difference of one of N and 0.

4. The system of claim 1, wherein the artifact removal unit detects the end of the contour by detecting a first pair of pixels where the difference the pixels is one of Not 0 or N and a direction of the difference has changed.

5. The system of claim 1, wherein the artifact removal unit further comprises a plurality of lines of computer code.

6. The system of claim 1, wherein the piece of content is one of an image, a color image and a video frame.

7. The system of claim 6, wherein the color image is an image for each color that makes up the color image.

8. The system of claim 6, wherein the video frame is a series of images.

9. A method for removing a compression artifact from an original piece of content, the method comprising:

detecting a start of a step contour and an end of a step contour in each row or column of the piece of content;

determining a gradient of the step contour in each row or column; and incrementing a pixel in certain regions of the row or column to restore the gradient in the piece of content.

10. The method of claim 9, wherein incrementing the pixel in certain region of the row or column further comprising multiplying a position of the pixel relative to a start of the row or column by a determined gradient for the row or column.

11. The method of claim 9, wherein detecting the start of the contour further comprises detecting a first pair of pixels scanned with a difference of one of N and 0.

12. The method of claim 9, wherein detecting the end of the contour further comprises detecting a first pair of pixels where the difference the pixels is one of Not 0 or N and a direction of the difference has changed.

13. The method of claim 9, wherein the piece of content is one of an image, a color image and a video frame.

14. The method of claim 13, wherein the color image is an image for each color that makes up the color image.

15. The method of claim 14, wherein the video frame is a series of images.

* * * * *